(12) United States Patent
Zhou

(10) Patent No.: US 6,686,564 B2
(45) Date of Patent: Feb. 3, 2004

(54) FOOD PREPARATION DEVICE WITH SMART SPRING

(75) Inventor: Li Min Zhou, Hung Hom (HK)

(73) Assignee: The Hong Kong Polytechnic University, Hung Hom (HK)

(*) Notice: Subject to any disclaimer, the term of this patent is extended or adjusted under 35 U.S.C. 154(b) by 23 days.

(21) Appl. No.: 10/094,138

(22) Filed: Mar. 11, 2002

(65) Prior Publication Data

US 2003/0168438 A1 Sep. 11, 2003

(51) Int. Cl.[7] ................................................. A47J 37/08
(52) U.S. Cl. ...................... 219/386; 219/392; 99/335; 99/391
(58) Field of Search ................................ 219/386, 385, 219/392, 411, 214; 99/327, 334, 335, 385, 393; 148/402

(56) References Cited

U.S. PATENT DOCUMENTS

| | | | |
|---|---|---|---|
| 4,884,557 A | * | 12/1989 | Takehana et al. ............ 148/402 |
| 6,516,146 B1 | * | 2/2003 | Kosaka ......................... 148/402 |
| 2003/0000524 A1 | * | 1/2003 | Anderson et al. ....... 128/203.23 |

* cited by examiner

Primary Examiner—Joseph Pelham
(74) Attorney, Agent, or Firm—Leydig, Voit & Mayer, Ltd.

(57) ABSTRACT

A food preparation device such as toaster includes a chassis, a heating element, and a carriage for directly or indirectly supporting a food item. The carriage is movable with respect to the chassis to move the food item to or from a cooking position adjacent to the heating element. A Shape Memory Alloy resistance member is connected between the carriage and the chassis. Electric circuitry controls voltage/current to the Shape Memory Alloy resistance member to selectively heat the resistance member and alter its shape to move the carriage to or from the cooking position.

7 Claims, 6 Drawing Sheets

FOOD PREPARATION DEVICE WITH SMART SPRING

BACKGROUND OF THE INVENTION

The present invention relates to a food preparation device including a toaster, an oven, and a food warmer, having a smart spring. More particularly, although not exclusively, the invention relates to a toaster/oven/food warmer having a spring or other deformable member made of Shape Memory Alloy (SMA) metal.

Known toasters for example include a carriage that is moved vertically or horizontally against the tension of a spring. In the heating position, the carriage is held down or back by a catch. At the end of the selected heating time, the catch is released to in turn release the carriage which returns under spring force to deliver the food item to a retrieval position. A number of different mechanisms have been proposed, but they are all fairly complex in design and unnecessarily expensive to produce.

Also, the type of mechanism described above releases the spring suddenly so that the carriage returns to the retrieval position with a jolt. This can be noisy and can sometimes result in the food being catapulted to the floor.

OBJECTS OF THE INVENTION

It is an object of the present invention to overcome or substantially ameliorate at least one of the above disadvantages and/or more generally to provide an improved toaster having a smart spring.

DISCLOSURE OF THE INVENTION

There is disclosed herein a food preparation device comprising:
  a chassis,
  a heating element supported by the chassis,
  a carriage for directly or indirectly supporting a food item, the carriage being movable with respect to the chassis to move the food item to/from a cooking position adjacent to the heating element,
  an SMA resistance member connected to the carriage and the chassis, and
  electric/electronic circuitry controlling voltage and/or current to the SMA resistance member to selectively heat the resistance member and alter its shape to move the carriage to/from the cooking position.

Preferably, the resistance member is in the form of a coil spring.

When an SMA material is heated to its transformation temperature, it will take on its memorised shape or length. In the present invention, the memorised shape of the resistance member is typically of contracted length.

Preferably, when heated, the SMA resistance member is of a contracted length.

Preferably the carriage is at a food item-retrieval position when the SMA resistance member is at its heated and contracted length.

As an alternative, the SMA resistance member is in the form of a length of wire riding along a number of pulley wheels mounted directly or indirectly to the chassis.

Preferably, the electric/electronic circuitry provides a pulsed, or otherwise controlled voltage/current to the SMA resistance member so as not to burn-out the resistance member when it is contracted.

There is further disclosed herein a method of altering the state of an SMA resistance member of the method comprising applying a pulse of high voltage/current to the member so as to quickly increase its temperature to a transition temperature and thereafter applying less voltage/current, either by reduced continuous current or pulses of voltage/current, to maintain the temperature at or slightly higher than the transformation temperature.

BRIEF DESCRIPTION OF THE DRAWINGS

Preferred forms of the present invention will now be described by way of example with reference to the accompanying drawings, wherein.

DESCRIPTION OF THE PREFERRED EMBODIMENT

Figure 1:
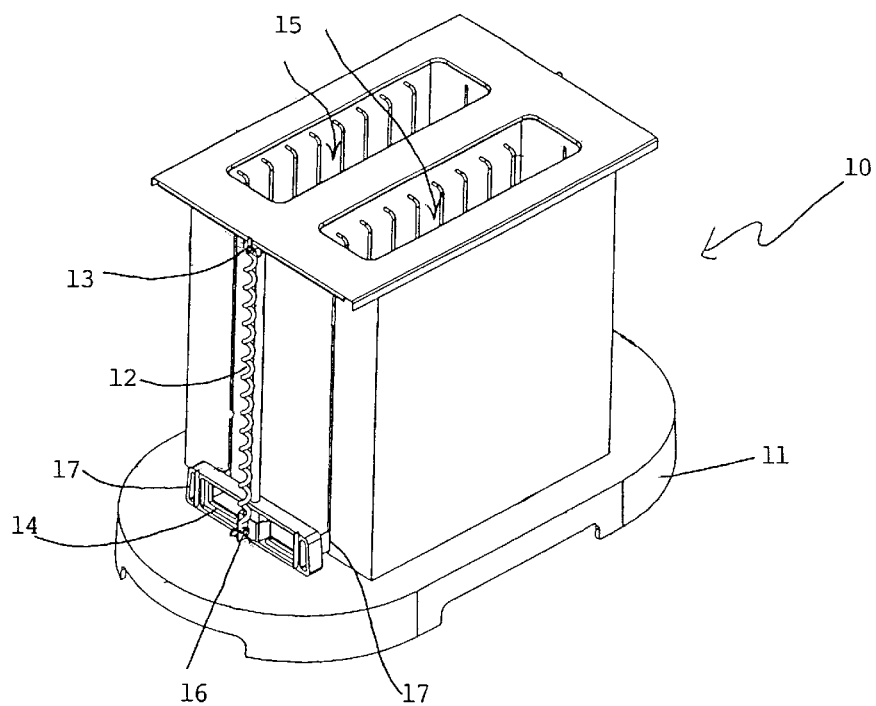
FIG. 1 is a schematic perspective view of a toaster chassis.
Figure 2:
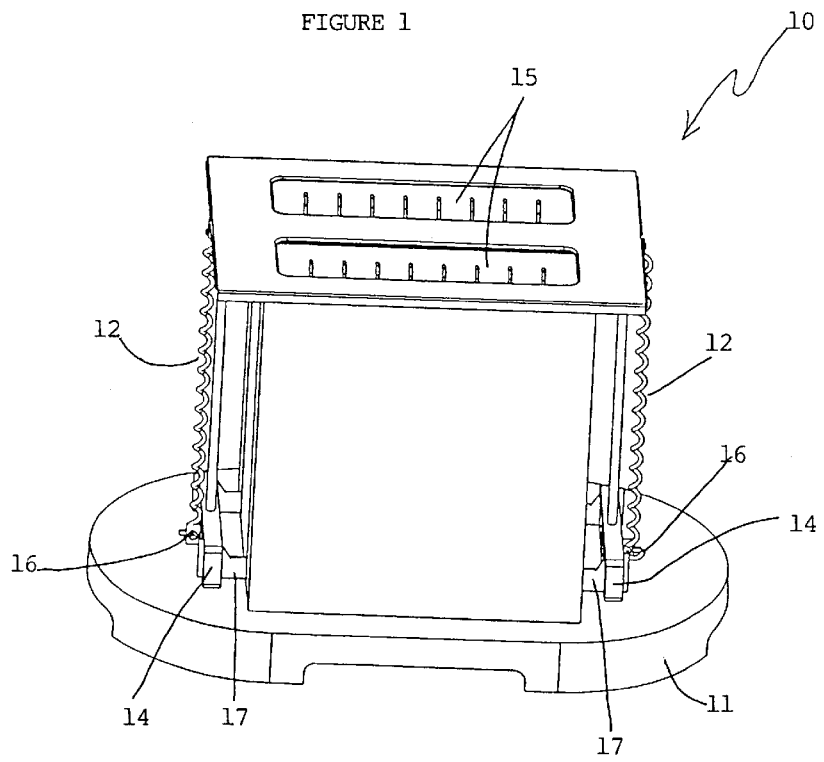
FIG. 2 is another schematic perspective view of the chassis of FIG. 1.

In FIGS. 1 and 2 of the accompanying drawings there is schematically depicted a toaster chassis 10 upon a toaster base 11. There would be a cover (not shown) around the chassis 11 and extending down to the base 11. The major toasting components mounted to the chassis 10 including the bread/toast cradle 15, the heating elements (not shown) etc. can be conventional components and will therefore not be described.

At an upper point on the chassis 10, there is provided an upper hook or lug 13. To this hook there is connected a smart spring 12 made of Shape Memory Alloy (SMA) material. The bottom end of the smart spring 12 is connected to a lower hook or lug 16 which extends from a carriage 14. Carriage 14 is connected via bars 17 to the bread/toast cradle 15. That is, the carriage 14 can move up and down with means supporting the bread or toast.

The features described in the preceding paragraph can be repeated at the other end of the toaster chassis as shown in FIG. 2. That is, the bars 16 can be repeated at or extend to the other end of the chassis.

Figure 3:
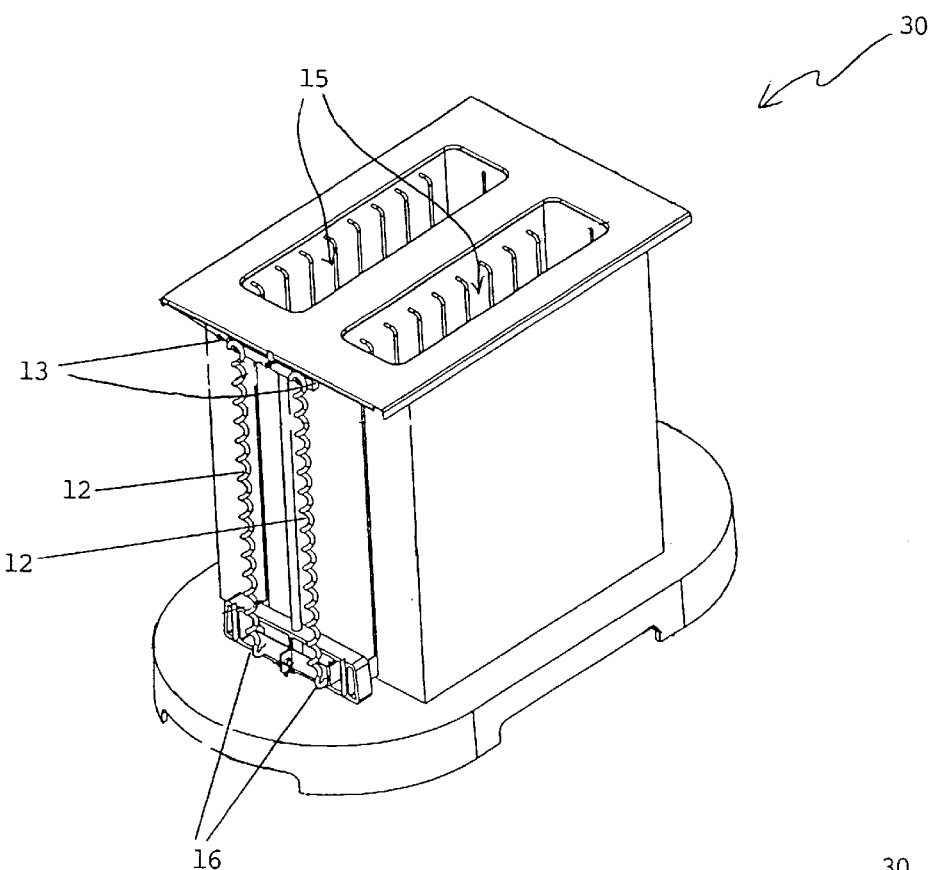
FIG. 3 is a schematic perspective view of another toaster chassis.
Figure 4:
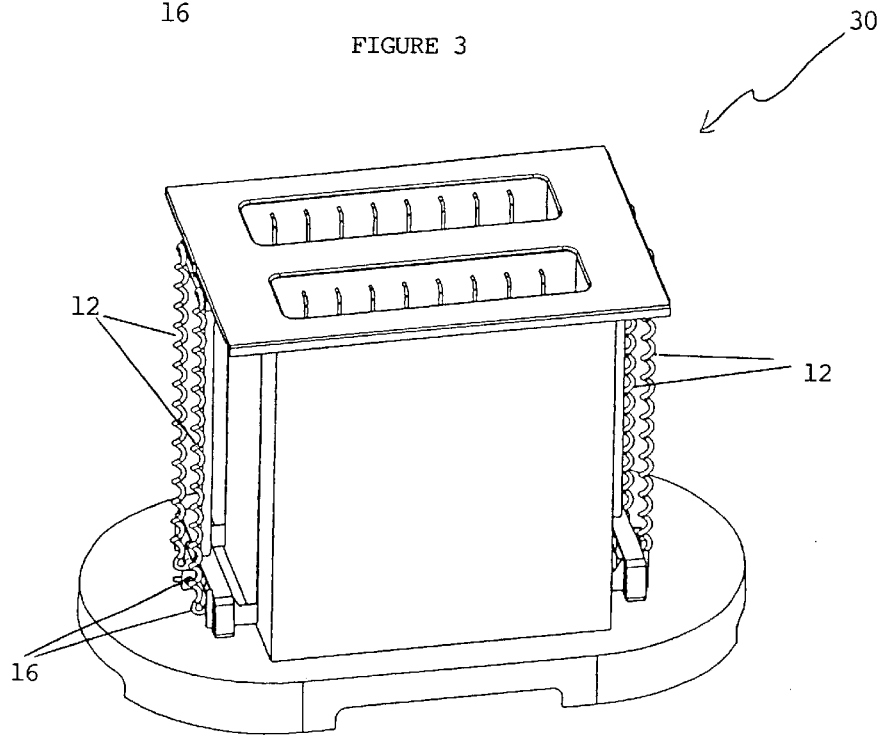
FIG. 4 is another schematic perspective view of the toaster chassis of FIG. 3.

In FIG. 3, another toaster chassis 30 has a pair of smart springs 13, upper hooks 12 and lower hooks 16. As shown in FIG. 4, these features can be repeated at the other end of the chassis.

Figure 5:
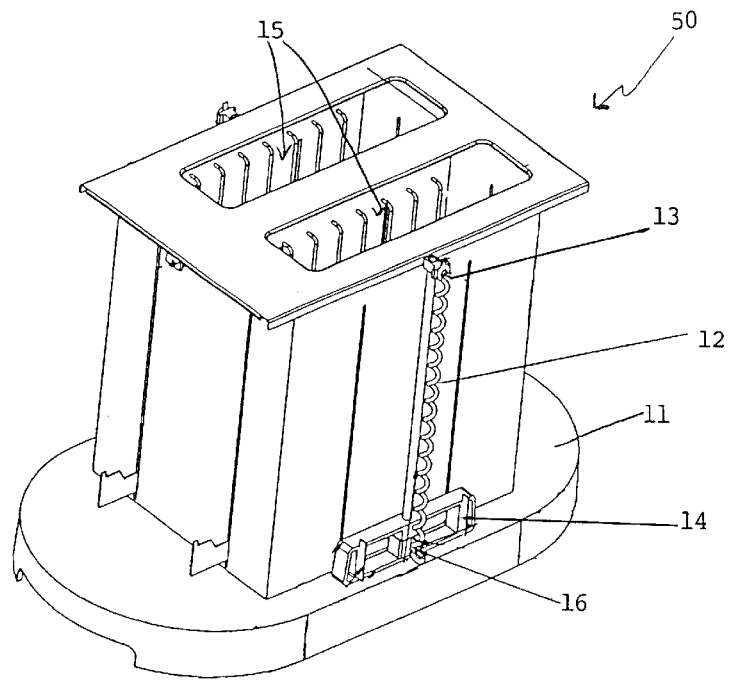
FIG. 5 is a schematic prospective view of another toaster chassis.

In FIG. 5 there is depicted a different toaster chassis 50, this time having an upper hook 12, smart spring 13, lower hook 16 and carriage 14 at each lateral side of the bread cradles 15.

Figure 6:
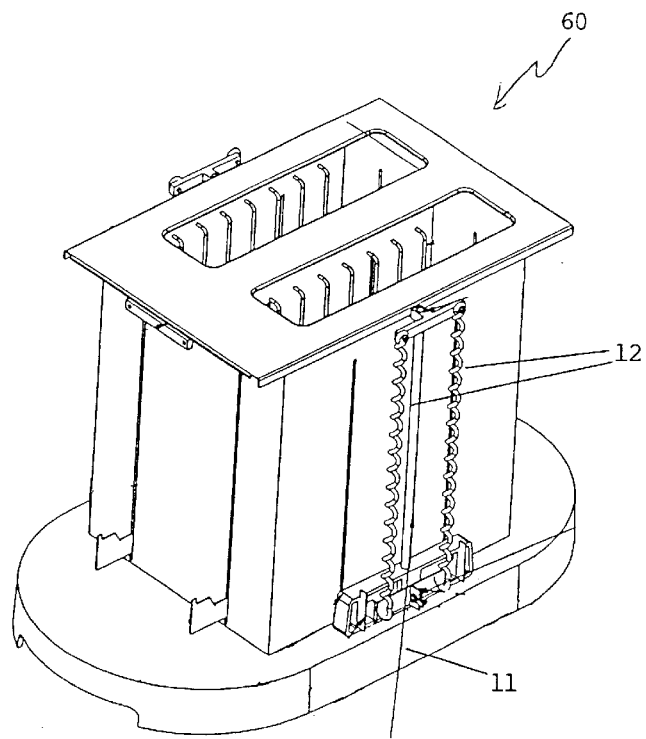
FIG. 6 is a schematic prospective view of another toaster chassis.

As shown in FIG. 6, there can be provided a pair of smart springs 12 and associated hooks and cradle at each lateral side of a different toaster chassis 60.

Figure 7:
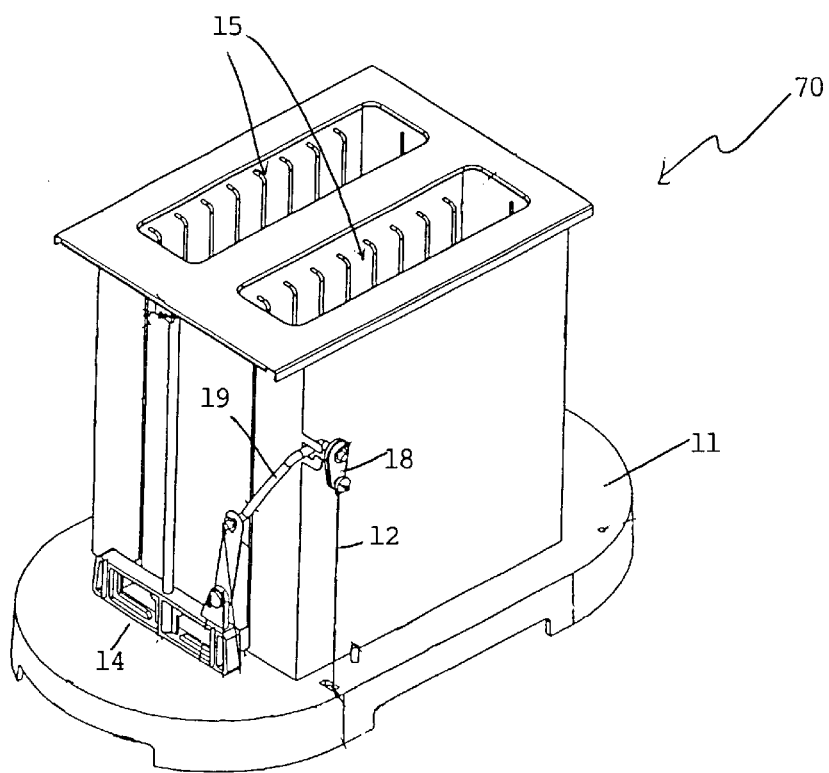
FIG. 7 is a schematic perspective view of yet another toaster chassis.
Figure 8:
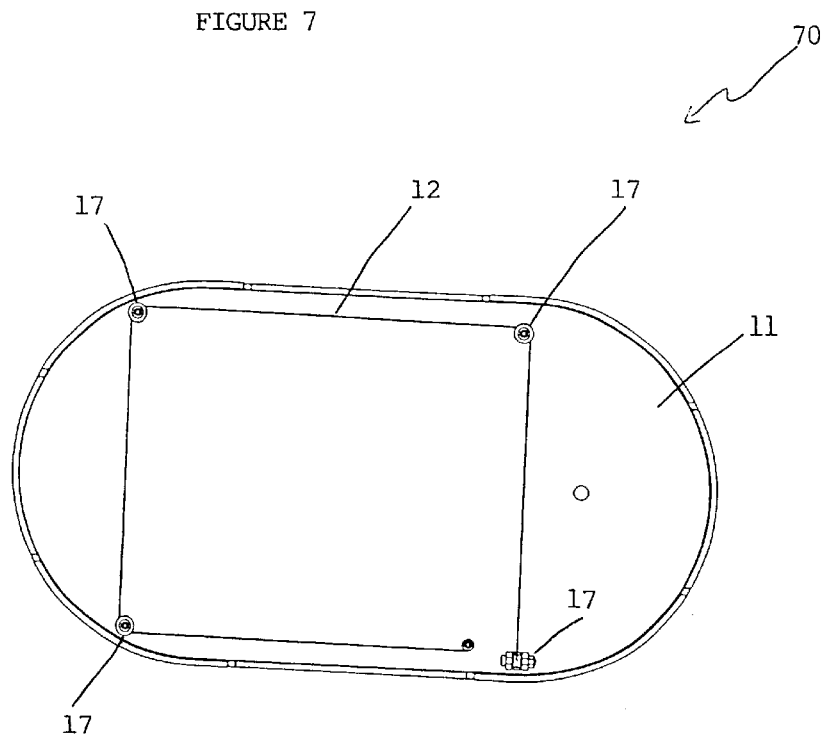
FIG. 8 is a schematic inverted plan view of the toaster chassis of FIG. 7.

In FIGS. 7 and 8 there is depicted a toaster chassis 70 which, instead of having a smart spring in the form of a coil as shown in the preceding figures, has an elongate strand 12 of SMA alloy. This single-strand must be out-stretched as compared to the coiled spring of the preceding figures. The amount of SMA material in the single strand 12 of FIGS. 7 and 8 might be approximately the same as that in the coiled version. As can be seen in FIGS. 7 and 8, the single-strand 12 passes around a number of pulley wheels 17. One end of the Strand 12 is attached to an anchor 18 from which their extends a tie 19. Tie 19 is attached via a linkage to the carriage 14. The pulley wheels 17 would be made of a heat-resistant material such as a ceramic for example, as the SMA material will become heated when a potential difference is applied thereto.

Somewhere within the toaster, preferably insulated from heat generated by the heating elements, there is provided an electric/electronic control circuit which includes the various electronic components that might be used in such a circuit and will not be described in detail. Suffice to say, the circuitry might control voltage and/or current intensity and/or frequency as delivered to the smart spring.

It is envisaged that the toaster will comprise a number of operational buttons. For example, the toaster might employ a single button, a pair of buttons, or three buttons depending on designing choice and/or market demand. One such button might be a start button, another might be an emergency stop button and another might be a timer-setting button.

Figure 9:
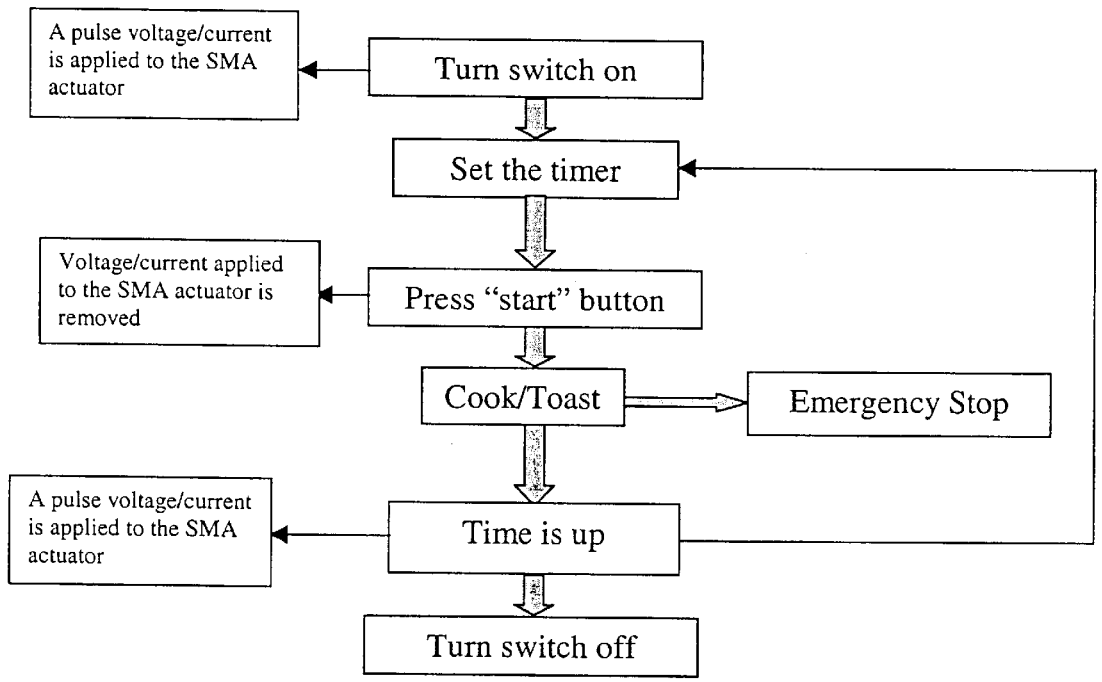
FIG. 9 is a schematic flow diagram of an operational sequence for a toaster.

In FIG. 9 there is depicted a flow diagram by which the operation of a toaster can be described. Firstly however, it should be understood that an ordinary room temperature, the smart spring 12 becomes somewhat jelly-like and easily stretched without displaying any apparent elasticity. That is, at room temperature, the smart spring is easily extended, just by the weight of the carriage that is attached to it. Accordingly, when the smart spring is at ordinary room temperature, the carriage will be in the down-position. When the smart spring is heated to its transformation temperature, it will take on its memorised configuration and inherent physical properties such as elasticity, plasticity, etc. Moreover, it will take on the configuration as shown in FIG. 1 for example—i.e., a configuration that has the carriage at the up-position.

When voltage/current is applied to the smart spring its internal resistance causes the spring to heat to and beyond the transformation temperature of the SMA (the temperature at which it takes on its memorised configuration). If a too-high voltage/current were applied continuously to the smart spring, it might overheat and burn out.

This problem is addressed after pressing the "On" button to preheat the smart spring, by providing a pulse of voltage/current followed by a reduced or temperature-maintenance voltage/current for the smart spring during the pre-toasting period.

Bread might already be in the bread cradle or might be inserted during or after the preheating period. Another button or "Start" button (or the same button) can then be pressed to initiate the toasting period. During this period, no current is applied to the smart spring and it therefore stretches under the weight of the cradle and bread, thereby smoothly lowering the bread to a position adjacent to the heating elements. The heating elements receive voltage/current by switching that is provided either by the control circuit, or buy some ancillary circuitry or switching device. During the toasting period, a "Stop" button can be pressed to turn off the heating elements and apply a pulse current followed by a reduced temperature-maintenance current to the smart spring so as to lift the cradle to the toast-retrieval position.

When toasting is completed and the toast removed, the toaster can be switched off and current is no longer delivered to the smart spring.

Figure 10:
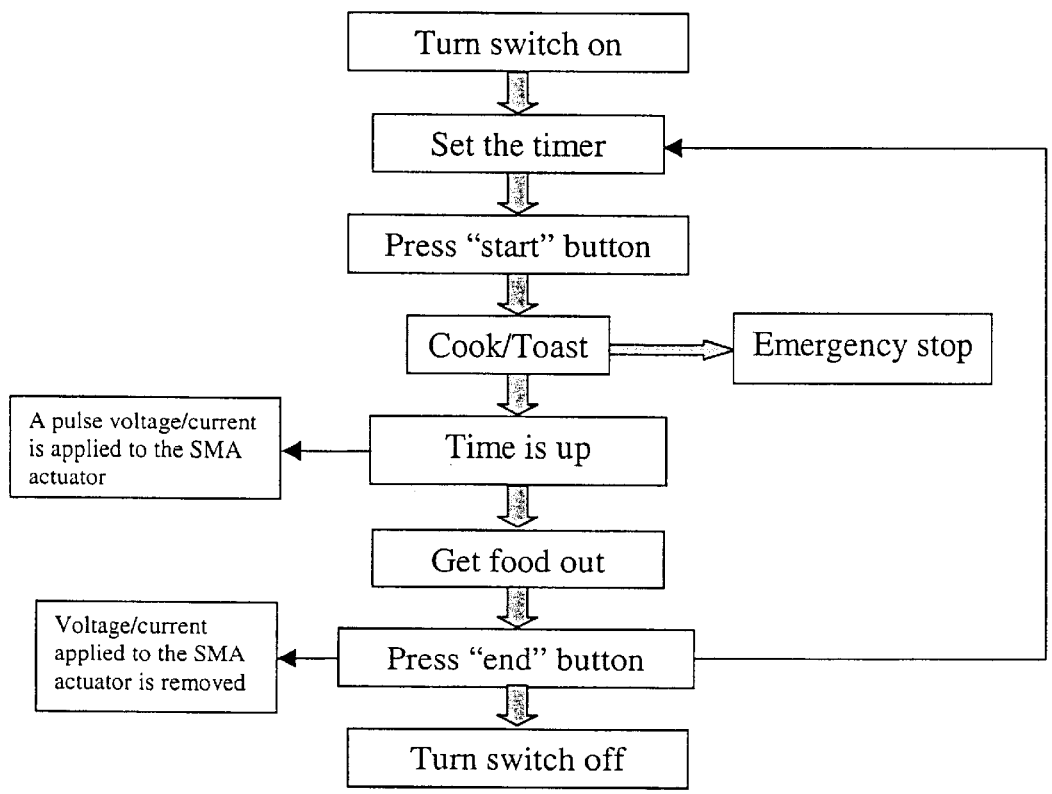
FIG. 10 is a schematic flow diagram of an operational sequence for another toaster.

In a three-switch embodiment (or in a toaster with one, two or more switches), there might be no need for an "On" button. As shown in FIG. 10, the toaster might simply be switched on, the timer set and a "Start" button pressed. The cradle would already be at its down-position. During toasting, there is no current applied to the smart spring. An emergency "Stop" button can be pressed during the toasting period so as to apply a current to the smart spring to raise the cradle and toast. When the pre-set time is up, a pulse current is applied to the smart spring to raise the cradle and toast to the retrieval position. This is followed by a low temperature-maintenance current to maintain the toast and its retrieval position. Once the toast is retrieved, the toaster can be switched off whereupon the smart spring will stretch under the weight of the cradle to its down-position.

It should be appreciated that modifications and alterations obvious to those skilled in the art are not to be considered as beyond the scope of the present invention. For example, the memorised configuration of the smart spring might be an extended, rather than a retracted configuration. If this were the case, a different current cycle might of course have to be applied to it.

What is claimed is:

1. A food preparation device comprising:
    a chassis,
    a heating element supported by the chassis,
    a carriage for supporting a food item, the carriage being movable with respect to the chassis to move the food item to/from a cooking position adjacent to the heating element,
    an SMA resistance member connected to the carriage and the chassis, and
    circuitry controlling voltage and/or current to the SMA resistance member to selectively heat the resistance member and alter its shape to move the carriage to/from the cooking position.

2. The food preparation device of claim 1, wherein the SMA resistance member is in the form of a coil spring.

3. The food preparation device in claim 1, wherein, when heated, the SMA resistance member is of a contracted length.

4. The food preparation device of claim 3, wherein the carriage is at a food item-retrieval position when the SMA resistance member is at its heated and contracted length.

5. The food preparation device of claim 1, wherein the SMA resistance member is in the form of a length of wire riding along a number of pulley wheels mounted to the chassis.

6. The food preparation device of claim 1, wherein the circuitry provides a controlled voltage and/or current to the SMA resistance member so as not to burn-out the resistance member when it is contracted.

7. The food preparation device of claim 6, wherein the circuitry provides a pulsed controlled voltage and/or current to the SMA resistance member.

* * * * *